Oct. 27, 1925.
G. BROULHIET
1,559,310
ELASTIC HUB SHOCK ABSORBER
Filed March 21, 1924      2 Sheets-Sheet 1
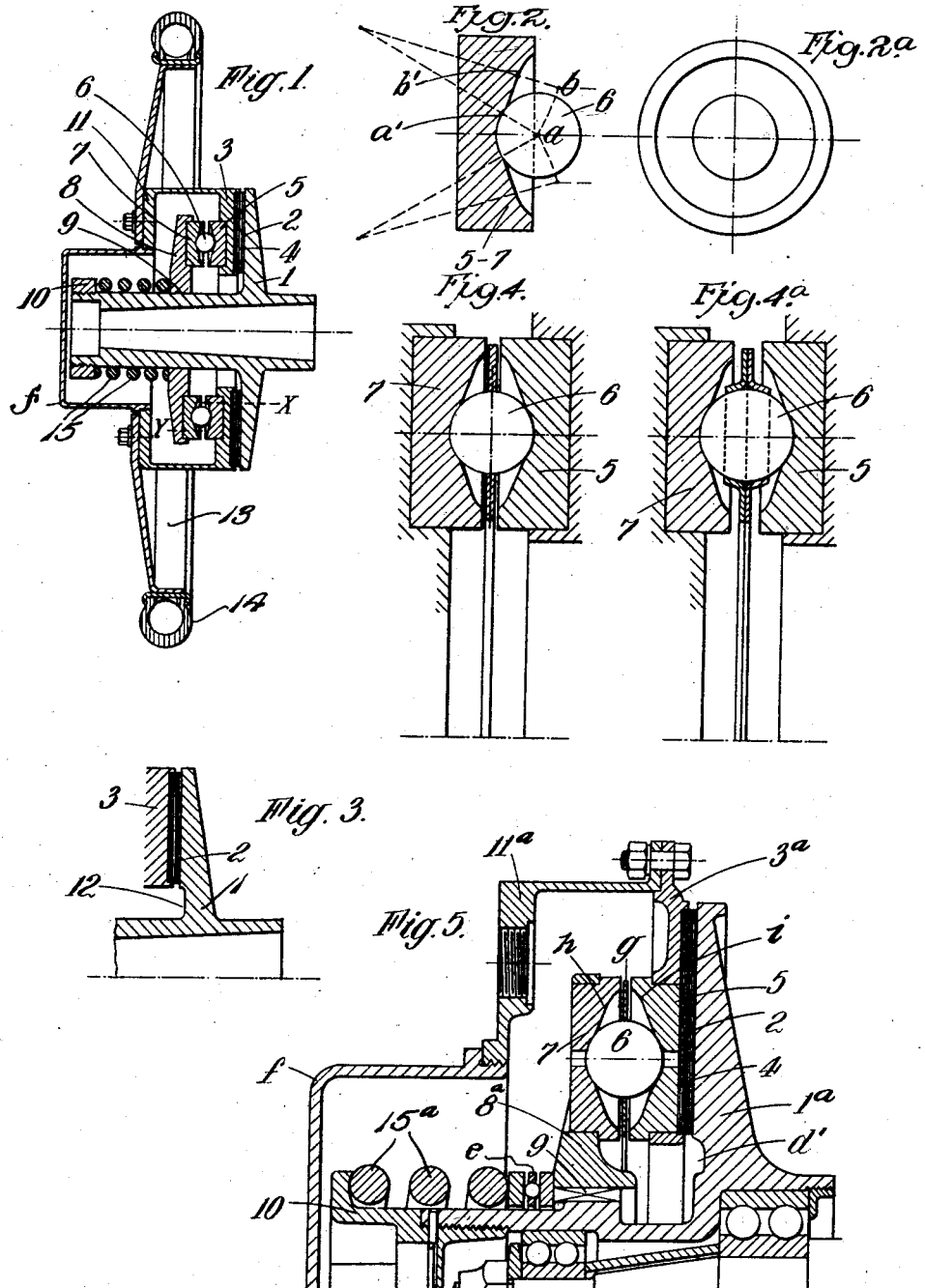

Oct. 27, 1925.  
G. BROULHIET  
1,559,310  
ELASTIC HUB SHOCK ABSORBER  
Filed March 21, 1924  
2 Sheets-Sheet 2
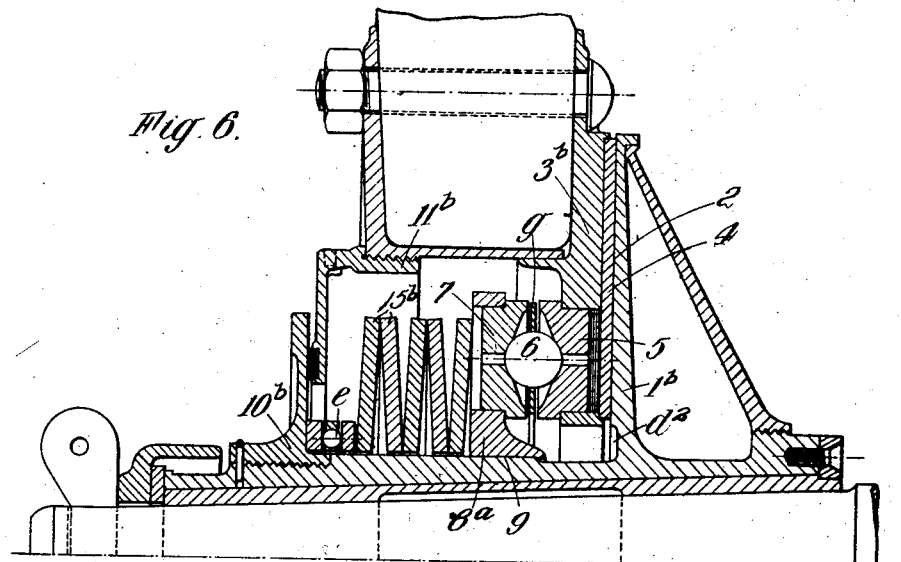
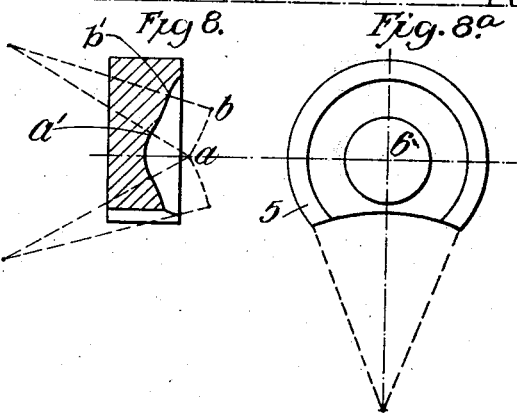
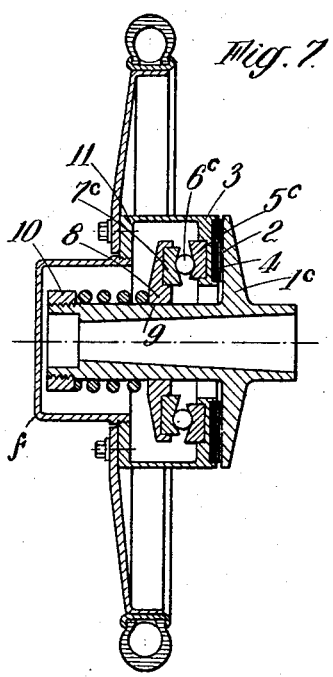
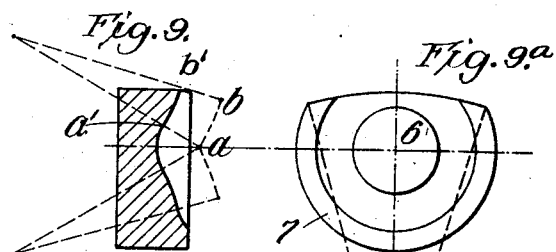

Patented Oct. 27, 1925.

1,559,310

UNITED STATES PATENT OFFICE.

GEORGES BROULHIET, OF ST. ETIENNE, FRANCE.

ELASTIC-HUB SHOCK ABSORBER.

Application filed March 21, 1924. Serial No. 700,865.

*To all whom it may concern:*

Be it known that I, GEORGES BROULHIET, a citizen of the French Republic, residing in St. Etienne, France, have invented certain new and useful Improvements in Elastic-Hub Shock Absorbers, of which the following is a specification.

This invention consists in an improved elastic hub shock absorber, the object being to construct the hub arrangements in a manner to enable them to fulfill the conditions of functioning required by the vehicle-suspension theory hereinafter set forth.

A motor vehicle running on uneven ground may be separated into two parts:—

(1) That which is compelled, by reason of its function, to follow the irregularities of the road, such as the tyres, wheels and all the parts which are connected therewith without the interposition of any suspension device other than the tyre. To this part of the vehicle the name "rolling system" has been given.

(2) The rest of the vehicle, for which the suspension separating it from the rolling system should, if it is perfect, assure a strictly horizontal trajectory, without vertical rebounds, that is to say without shocks or accelerations. This portion of the vehicle is termed the suspended body.

Thus the suspension of a motor vehicle, in the sense in which it is most generally referred to, may be defined as the part serving to connect the rolling system with the suspended body and should be constructed under the best conditions possible so as to assure a horizontal trajectory of the body, on the one hand, and on the other hand to secure for the rolling system the best functionary conditions.

It will be understood that the rolling system is subjected to vertical accelerations. It is only in the case where the road is perfectly level that its movement is purely a horizontal trajectory.

But the rolling system is a moving device suspended between two resilient elements, namely the suspension of the vehicle and the tyre. Theory in respect to the best system of body suspension indicates that the suspension between the rolling system and the body should be perfectly elastic and should exclude absorption of work. If, therefore, the tyre is not capable of absorbing work, the vertical oscillations of the rolling system engendered by the irregularities of the road will not be reduced and will not cease. This is what happens most frequently and the discomfort of motor vehicles is due more to the rebounds of the rolling system on the ground than to the rebounds of the body on its suspension.

There exists apparatus which eliminates the rebounds of the body on its suspension. Devices for eliminating the rebounds of the rolling system on the ground or preventing synchronous oscillations from being produced without detriment to the body suspension are being investigated in various quarters and have not yet passed into practical use.

To solve this problem, a large number of investigators have thought it was sufficient merely to suspend the axle of the wheel by means of a purely elastic hub. This means alone is not sufficient, for the following reasons:

At the moment of passing an obstacle if the undercarriage or the wheel, i. e. a portion of the rolling system, is jerked vertically by the obstacle acting as a spring board, this part of the rolling system immediately borrows from the motor of the vehicle a dynamic energy equal to $\frac{1}{2}$ of $M V^2$, M being the mass of the rolling system and V the maximum vertical speed of the jerking movement of the obstacle. It is known that the pendulous movement of the rolling system, interposed between the tyre and the suspension of the vehicle, will cease only when the dynamic energy equal to $\frac{1}{2}$ of $M V^2$ has been completely absorbed, either by the passive forces of the rolling system or by suitable devices arranged at the proper places.

It may be observed, however, that the amount of energy to be overcome is proportional to the mass, therefore to the weight of the rolling system, and is proportional also to the square of the speed of movement in the vertical direction.

The speed of the movement is evidently a function of the speed of the vehicle and the nature of the obstacle on the road. It is a constant which is independent of the constructive conditions of the vehicle. Therefore, the dynamic energy must be overcome in order to absorb shocks on the rolling system can only be diminished by reducing the mass of the rolling system, the sole factor of dynamic energy connected with the vehicle.

The above explanation is given in order to show that the aim of the investigators whose efforts were directed to the embodiment of a purely elastic hub has been to substitute the elasticity of the hub for the suspension. The consequence of such substitution would be that the hub would need to have an elastic displacement equal in extent to the displacement of the suspension which the said hub is to replace.

If such a device were embodied, the weight of the rolling system would be reduced to the weight of the wheel arranged about an elastic hub and the dynamic energy to be absorbed in absorbing the rebound of the wheel on the ground would then be of the lowest possible amount. It is, seen, therefore, that the problem may be worked out to exact figures and assumes as an extreme arrangement the form of an elastic hub with a large displacement in which the dynamic energy to be reduced has the smallest value.

It is, therefore, comprehensible that according as the possible path of movement of the hub is diminished, so the dynamic energy to be overcome in the hub becomes greater and greater because the dynamic energy of the rolling system set in oscillation by the irregularities of the road will continue to increase.

On this theory, the applicant has constructed apparatus which he has called "centre brake". This apparatus is reduced systematically to a hub shifting elastically in the wheel and a device arranged in parallel for absorbing energy by friction. Friction and the elastic device have been combined in such a manner that the same spring acts on the elastic device and engenders the friction. They have also been so combined that the ratio of the energy overcome by friction to the energy elastically restored may be kept constant in practice.

The invention will be described with reference to the accompanying two sheets of diagrammatic drawings, in which:—

Fig. 1 is a vertical section of a wheel and hub having the invention applied.

Figs. 2 and 2ª are, respectively, a section and elevation to an enlarged scale, of a seating for the ball bearings shown in Fig. 1.

Fig. 3 is a fragmentary section to an enlarged scale of a friction member shown in Fig. 1.

Figs. 4 and 4ª are two detail sections of ball bearings, and their seatings, the balls being mounted in cages.

Fig. 5 is a vertical section showing a modified arrangement of a wheel hub having the invention applied.

Fig. 6 is a similar section showing a further modification.

Fig. 7 is a section of a hub and wheel similar to those in Fig. 1.

Figs. 8, 8ª, 9, and 9ª are diagrammatic views illustrating the profiles of ball seatings.

Like parts in the several figures are denoted by like reference numerals or letters.

The device illustrated in Fig. 1 comprises as an essential part a hub 1, provided with a friction surface 2, a false hub or drum 3, having a friction piece 4 rubbing on the surface 2 of the hub 1. This drum carries internally a series of seatings 5 to receive on their faces balls 6. These balls are also housed in a counter-seating 7 carried by a disc 8 to which they are fitted. Each seating has provided on its face a recess or depression.

This disc 8 is capable of sliding longitudinally, by means of its opening 9, on the hub 1, about which it rotates. A spring of any shape, but which may be helical as shown at 15 (Fig. 1) or at 15ª (Fig. 5), presses the disc 8 against the balls. The spring may, however, be constituted by Belleville washers as illustrated at 15ᵇ in Fig. 6. The balls transmit the thrust to the drum, which transmits it to the friction disc or piece 4; on the drum 3 is fixed, in any manner, the wheel 13 carrying the tyre 14; in the present case I have shown a wheel 13 of the Michelin type carrying the tyre 14.

A nut 10, screwed on the hub, permits of tightening the spring and of adjustment for obtaining a suitable set or compression. The above described arrangement of the apparatus has not sufficed to produce a good functioning of the whole. The following modified arrangements have therefore been applied to the arrangement:

When the apparatus is in operation and the seatings are displaced, balls roll in the seatings thereby separating them and compressing the spring. The result is that the force of friction and the elastic force tending to return the balls to the centre of the seating increase proportionately to the compression of the spring. This is a drawback, because from the very beginning of the movement the damped elastic hub loses its sensitiveness. It is of advantage that the force opposed to the displacement of the centre of the hub in the hub should remain nearly constant about a value slightly higher than the load of the wheel. It is not necessary that this force should increase.

If the seatings were strictly conical and if the spring while being strained did not increase in strength, that is to say if it had infinite flexibility, the condition sought would be realized, but it can only be attained by employing an infinitely flexible spring, the weight and bulk of which would be prohibitive. The arrangement employed consists in giving to the seatings an inclination which diminishes according the further a point on the face is from the centre of the depression, so that as the ball withdraws from the centre it meets with a surface less inclined. The section of a seating fulfilling this requirement has a sinuous profile or configuration somewhat resembling a printer's bracket, as is seen in Fig. 2.

In the seating shown by way of example, the initial inclination is one of about 60° and that of the end portion about 30°. Such a seating assures the following functioning: In the displacement of the hub the spring is compressed and the frictional force increases but the diminution of the slope on which the ball rolls in the seating gives a component tending to return the balls to the centre, which component continues to diminish, and the seating inclination may even be constructed in such a manner that the diminution of the centre restoring force is exactly equal to the increase in the frictional force.

The curve $ab$ in Fig. 2 is the path suitable for the centre of the ball to follow, in order to obtain the aforesaid effect. The section or profile of the seating is determined by the curve of the path of the exterior of the ball, the centre of which is displaced in accordance with this curve. When the ball reaches the end of its course at the point $b$ its position limits definitely along the arc $a' b'$ the form of the extension of the section of the seating. It will be seen that when the ball has its centre at the point $b$ it rests in accordance with the arc $a' b'$ in the bottom of the seating and cannot go any farther. This arrangement permits of dispensing with all other driving systems.

The elastic hub may therefore be reduced, from the drive point of view, to the diagrammatic simplicity of Fig. 1 without providing, even for braked wheels, any other devices for producing rotary movement than the balls in the seatings; a seating which is not provided with the profile described above may also very well produce a driving movement but the value of the torque of the movement cannot exceed the torque of the elastic reaction provided for in its construction. The steeper inclination given to the marginal portions of the seatings constitutes a safety device and prevents the balls from leaving their recesses.

The wheel and hub construction in Fig. 1 is completed by the flange 11 forming part of the drum 3. In order that the balls may not fall out from between the seatings, the distance from the flange 11 to the disc or seating-carrier 8, movable on the axle, is less than the distance by which the seatings would have to be separated to enable the balls to fall out.

Experience shows that if the ball device can function dry without being lubricated, the rubbing surface preserves a constant friction coefficient only if its lubrication is constantly assured under the same conditions. For this purpose, the central part of the friction surface 2 is, as shown in Fig. 3, hollowed so that when the drum 3 leaves the centre there remains at 12, between the hub and the friction member, a free space filled by the lubricating matter which is enclosed in the apparatus and with which the frictional member is supplied.

In the movements of the drum 3 on the hub 1 the lubricating matter is thus introduced into the friction joint by passing over it.

Experience also shows that when the "centre brake" is in operation, under the action of the recoil movements of the piece 8 and of the slight rotary movements thereof in relation to the hub 1, the locking nut tends to be loosened owing to its adherence to the spring 15 which participates in the movements of the piece 8.

To obviate this inconvenience, a stop device, such as a thrust ball bearing as shown, for example, at $e$ in Fig. 5 may be inserted between the spring and its adjusting nut or, what amounts to the same thing, between the spring and the disc carrying the seatings.

The drum $3^a$, which is closed by a bolted joint and which once it is closed does not allow the balls to escape from their seatings, constitutes, by reason of its arrangement, a detachable whole which may be withdrawn from the axle carrying the hub without any internal demounting being necessary. To remove the hub, it is only necessary to remove the axle casing cap $f$, loosen the spring and to withdraw the hub by sliding the whole of the parts in the drum $3^a$ over the hub, the wheel carrying the hub being thus withdrawn in one piece and, without removal of the balls, permits examination of the friction surface.

It may happen that when the wheel receives a lateral shock, against the curb of a footpath for instance, the friction discs may separate, so that the balls are no longer in contact with the seatings and leave their normal positions, but when the hub returns to its operative position the balls return to their places, not by rolling but with a sliding movement which impairs the balls and the seatings.

When the seatings are not furnished with the recoil device described above, it may also happen that the balls will escape from their recesses. When the wheel transmits a couple, a working diagram shows that there are never more than three balls in actual contact, while the other balls leave their normal position. In this case and when the couple ceases and the wheel returns to the centre, the balls return to their position, no longer by rolling but by sliding. The result is likewise wear and tear on the balls and seatings.

To obviate these inconveniences, the balls may be housed in a cage which maintains them in their position even when certain seatings happen to become loose. A drawing clearly shows that whatever may be the position of rotation or radial displacement of the seatings of the hub and of the seatings of the drum, the exact position of the centres of the balls is on a circle.

On this circle are the centres of the holes of the ball cage. This ball cage may be constituted either in a manner identical with that of ordinary ball bearings, or by a single thin plate. In the former case, during erection, all the balls are held in the cage; in the later case, they must be placed in the cage during a fitting operation (Fig. 4).

The above mentioned arrangements are shown in the two accompanying drawings which are given as examples. The hub $1^a$, shown in Fig. 5, is an elastic hub shock absorber for motor vehicles, and in the figure is seen the sectional form of the seatings with sinuous profiles $h$ and $i$, the parts $3^a$ and $11^a$ constituting the drum, the movable seating carrier $8^a$, the recess $d'$ for lubrication of the frictional part, the thrust ball bearings $e$ constituting a recoil stop, the axle casing cap $f$, closing the drum and, finally, the ball cage $g$.

The hub $1^b$ shown in Fig. 6, is suitable for a gun-carriage wheel. It shows the same arrangements as the foregoing. The only difference is that the wheel is not detachable, the base of the wooden spokes being fixed directly on the drum constituted by the parts $3^b$ and $11^b$ and the axle cap $10^b$ arranged at the end being perforated to permit the removal of the end axle-pin externally of the apparatus. A sliding plate and a packing ring assure liquid tightness of the casing. The hub $1^b$ is provided with the recess $d^2$ for lubrication purposes.

The device shown in Fig. 7 enables the bulk and weight of the apparatus to be reduced by the considerable proportion of nearly one half.

This arrangement consists in dividing or truncating in Fig. 1 the seatings 5 of the movable part 3 along the line X, and the seatings 7 on the piece 8 sliding on the hub along the line Y, so that, when seen in section and elevation, the seatings of the movable part appear according to the arrangements of Figs. 8 and $8^a$ and the seatings on the part sliding on the hub according to the arrangements of Figs. 9 and $9^a$.

It is seen that the size of the seatings as a whole is reduced by twice the value of the truncature.

Fig. 7 represents the same apparatus as that shown in Fig. 1 in which the diameter of the whole has been reduced by the application of this arrangement.

The object of this arrangement is, when the hub $1^c$ is brought out of centre, to cause the balls $6^c$ to pass out of contact with the seatings $5^c$ and $7^c$ into the truncated parts in which they are to roll; but this involves no disadvantage since, at most, less than half of the balls are concerned in this case and all the seatings play the same part in the action of the mechanism on the vehicle, while the resultant of the transmitted forces is not altered. To prevent the balls which escape from the support from falling into the casing, they are mounted in a cage as referred to above.

In the elastic hub shock absorber for automobiles, the spring 15, shown in Fig. 1, is a helical spring. In the elastic hub for gun-carriage wheels (Fig. 6), the spring $15^h$ is composed of Belleville washers, but the use of a recoil device for the movable seating-carrier is obviated, since the springs, once they are compressed, themselves form thrust bearings between the drum and the movable seating-carrier.

Having thus described the nature of the said invention and the best means I know of carrying the same into practical effect, I claim:—

1. An elastic hub shock absorber for vehicles, comprising in combination with an axle, a hub having a friction surface, a wheel, a drum secured to said wheel coaxial with and displaceable in a radial direction relatively to said hub, a friction piece carried by said drum and in frictional engagement with said friction surface, a disc slidable on the hub enclosed in the drum, a set of seatings mounted on and internally of said drum, a second set of seatings on said disc, the two sets of seatings being oppositely disposed relatively to one another, balls enclosed between said sets of seatings, resilient means for pressing said disc against the balls, and means for adjusting the set of the said resilient means, each of said seatings having a depression on its face the curvature of which diminishes the further it is from the axis of the hub.

2. An elastic hub shock absorber for vehicles, comprising in combination with an axle, a hub having a friction surface, a wheel, a drum secured to said wheel coaxial with and displaceable in a radial direction relatively to said hub, a friction piece carried by said drum and in frictional engagement with said friction surface, a disc slidable on the hub enclosed in the drum, a set of seatings mounted on and internally of said drum, a second set of seatings on said disc, the two sets of seatings being oppositely disposed relatively to one another, balls enclosed between said sets of seatings, resilient means for pressing said disc against the balls, means for adjusting the set of the said resilient means, and means interposed between the sliding disc and said set adjusting means for limiting the sliding movement of the disc, each of said seatings having a depression on its face the curvature of which diminishes the further it is from the axis of the hub.

3. An elastic hub shock absorber for vehicles, comprising in combination with an axle, a hub having a friction surface, a wheel, a drum secured to said wheel coaxial with and displaceable in a radial direction relatively to said hub, a friction piece carried by said drum and in frictional engagement with said friction surface, a disc slidable on the hub enclosed in the drum, a set of seatings mounted on and internally of said drum, a second set of seatings on said disc, the two sets of seatings being oppositely disposed relatively to one another, balls enclosed between said sets of seatings, resilient means for pressing said disc against the balls, means for adjusting the set of the said resilient means, and means interposed between the sliding disc and said set adjusting means for limiting the sliding movement of the disc, said limiting means consisting of a thrust ball bearing, each of said seating having a depression on its face the curvature of which diminishes the further it is from the axis of the hub.

4. An elastic hub shock absorber for vehicles, comprising in combination with an axle, a hub having a friction surface, a wheel, a drum secured to said wheel coaxial with and displaceable in a radial direction relatively to said hub, a friction piece carried by said drum and in frictional engagement with said friction surface, a disc slidable on the hub enclosed in the drum, a set of seatings mounted on and internally of said drum, a second set of seatings on said disc, the two sets of seatings being oppositely disposed relatively to one another, cages enclosed between said sets of seatings, balls housed in said cages, resilient means for pressing said disc against the balls, and means for adjusting the set of the said resilient means each of said seatings having a depression on its face the curvature of which diminishes the further it is from the axis of the hub.

In witness whereof I have signed my name to this specification.

GEORGES BROULHIET. [L. S.]